United States Patent
Zhou et al.

(10) Patent No.: US 6,512,785 B1
(45) Date of Patent: Jan. 28, 2003

(54) MATCHED FILTER BANK

(75) Inventors: Changming Zhou, Tokyo (JP); Xuping Zhou, Tokyo (JP); Kunihiko Suzuki, Tokyo (JP); Xiaoxing Zhang, Tokyo (JP); Takashi Tomatsu, Tokyo (JP)

(73) Assignee: Yozan Inc., Tokyo (JP)

( * ) Notice: Subject to any disclaimer, the term of this patent is extended or adjusted under 35 U.S.C. 154(b) by 0 days.

(21) Appl. No.: 09/247,828

(22) Filed: Feb. 11, 1999

(30) Foreign Application Priority Data

Feb. 12, 1998 (JP) ............................................. 10-046180
Nov. 2, 1998 (JP) ............................................. 10-311531

(51) Int. Cl.[7] .......................... H04B 1/707; H04L 27/06
(52) U.S. Cl. ...................... 375/143; 375/152; 375/343; 708/314
(58) Field of Search ................................. 375/142, 143, 375/150, 152, 343; 708/314; 370/320, 335, 342, 441

(56) References Cited

U.S. PATENT DOCUMENTS

| | | | | |
|---|---|---|---|---|
| 5,696,762 A | * | 12/1997 | Natali et al. | ................. 370/320 |
| 5,956,333 A | * | 9/1999 | Zhou et al. | ................. 375/152 |
| 6,141,337 A | * | 10/2000 | Uta et al. | .................. 370/335 |
| 6,212,219 B1 | * | 4/2001 | Shou et al. | ................. 370/342 |

* cited by examiner

*Primary Examiner*—Don N. Vo
(74) *Attorney, Agent, or Firm*—Armstrong, Westerman & Hattori, LLP (57) ABSTRACT

A matched filter bank including a plurality of matched filters and a sampling and holding units commonly used by the total matched filters. Therefore, the circuit size is diminished.

An inverting amplifier for the matched filter with a variable gain includes an input capacitance, an inverting amplifier connected to an output of the input capacitance, and a plurality of feedback capacitances connected between an input and output of the inverting amplifier. A plurality of switches are connected to input side of the feedback capacitances for alternatively connecting the feedback capcitanec to the input of the inverting amplifier or a reference voltage. The feedback capacitances connected to the reference voltage are invalid with respect to a composite capacitance of the feedback capacitance and have no influence to the amplifier.

18 Claims, 10 Drawing Sheets

Prior Art

Fig.13

MATCHED FILTER BANK

DETAILED DESCRIPTION OF THE INVENTION

BACKGROUND OF THE INVENTION

1. Field of the Invention

The present invention relates to a matched filter bank, particularly to a matched filter bank used in a signal reception apparatus of a DS-CDMA cellular system.

2. Prior Art

Recently, the direct sequence code division multiple access (DS-CDMA) cellular system attracts attention as the users of the land mobile communication increase, because the DS-CDMA system has large capacity. In the DS-CDMA system, at a transmitter side, the transmission data is modulated and then spreaded by a PN-code, and at a receiver side, the received signal is despread by the PN-code so that the transmission data is reproduced. A sliding correlator or a matched filter is used for the despread. The sliding correlator is small in circuit size but needs a long time for the correlation calculation. While, the matched filter is fast in correlation calculation but is rather big in circuit size.

The conventional matched filter consists of a charge coupled device (CCD), a surface acoustic wave (SAW) device, or a digital circuit. A matched filter is proposed in Patent Publication Hei06-164320 by the inventors of the present invention, which consists of an analog circuit and is of high speed as well as low power consumption. The matched filter includes a sampling and holding circuit for holding a plurality of input analog signals as discrete data, a plurality of multiplication circuits for multiplying the analog signals by multipliers that are shifted and circulated and an adder for summing the multiplied data up.

Recently, a plurality of signals, with transmission rates different from one another, are necessary for multi-media communication. Therefore, a spreading ratio is changed (variable spreading ratio system), or two or more spread codes are parallelly used (multi-code system). For these systems, a plurality of matched filters with different number of taps are necessary. It makes the circuits size bigger and the power consumption increases.

Figure 12:
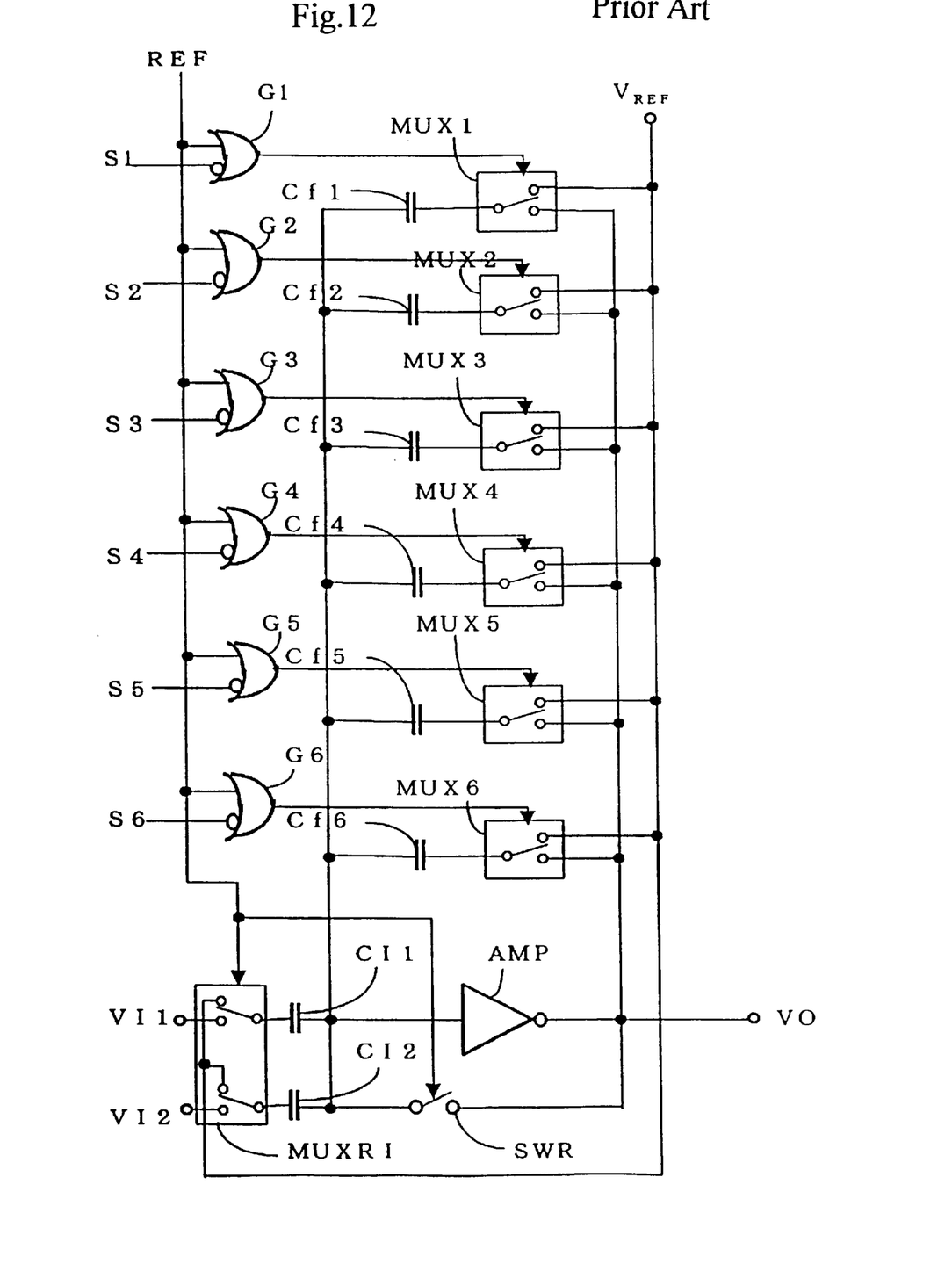
FIG. 12 is a circuit diagram showing a conventional inverting amplifier with a variable gain.

The above analog type matched filter proposed by the present inventors uses an inverting amplifier as shown in FIG. 12. The inverting amplifier includes an amplifier AMP with high gain, consisting of odd number of serial CMOS inverters. The amplifier AMP is connected at its input with a plurality of input capacitances CI1 and CI2. A plurality of feedback capacitances Cf1 to Cf6 are connected between the input and output of the amplifier AMP. The feedback capacitances Cf1 to Cf6 are connected to the output of the amplifier AMP through switches MUX1 to MUX6 which connect the feedback capacitanecs to the output of the amplifier or to a reference voltage Vref. For, example, the capacitances Cf1, Cf2, Cf3, Cf4, Cf5 and Cf6 have capacities proportional to $2^0$, $2^1$, $2^2$, $2^3$, $2^4$ and $2^5$, respectively, so various composite capacity can be realized by controlling the switches MUX1 to MUX6. The switches are controlled by control signals S1 to S6 through logical OR-gates G1 to G6 which further receive a refresh signal REF. The signals S1 to S6 are input with inverted to the OR-gate. When the output of the OR-gate is high level, the output of the OR-gates are low level, then the feedback capacitances are connected to the output of the amplifier AMP. When REF is high level or the control signals are low level, the output of the OR-gate is high level, then the feedback capacitances are connected to the reference voltage. The input capacitances CI1 and CI2 are connected at their input to a input refresh switch MUXR1, and an amp-refresh switch SWR is connected between the input and output of the amplifier AMP. The switches MUXR1 and SWR are controlled by the refresh signal REF. When refreshed, the input and output of the amplifier AMP is short-circuited, and CI1 and CI2 are connected to the reference voltage.

When it is assumed that the amplifier AMP has an ideal performance of infinite gain, the input of the amplifier is Vref, input voltages are VI1 and VI2 for CI1 to CI2, the Output of the amplifier is Vo, the weighted addition in the formula (1) is performed.

$$Vo = \frac{-VI1 \cdot CI1 - VI2 \cdot CI2 + Vref \cdot (CI1 + CI2 + Cf)}{Cf} \quad (1)$$

In a practical amplifier, the input voltage is not Vref and the gain is finite. When the gain is A, the total effective feedback capacitance is CVf, and the total ineffective feedback capacitance is CIf, the output Vo1 is expressed as shown in the formula (2).

$$Vo1 = \frac{-VI1 \cdot CI1 - VI2 \cdot cI2 + Vref(CI1 + CI2 + CVf)}{CVf + \frac{1}{A}(CI1 + CI2 + CVf + CIf)} \quad (2)$$

As will be understood from the formula (2), the error of the output is mainly influenced by a finite gain-bandwidth (GB) product. As the capacity of CIf increases, the error becomes bigger.

SUMMARY OF THE INVENTION

The present invention has an object to provide a matched filter bank for a plurality of spreading ratios, not only of low power consumption but also of small circuit size.

The present invention has another object to provide an inverting amplifying circuit, for a matched filter, which is simple, of high accuracy and of quick response.

A matched filter bank according to the present invention has a sampling and holding circuit commonly used by a plurality of matched filters.

An inverting amplifier circuits according to the present invention includes a plurality of feedback capacitances inputs of which are connected to an input of an amplifier or to a reference voltage for controlling a composite valid feedback capcitanec. The invalid capacitances are disconnected from the input of the amplifier.

PREFERRED EMBODIMENT

Figure 1:
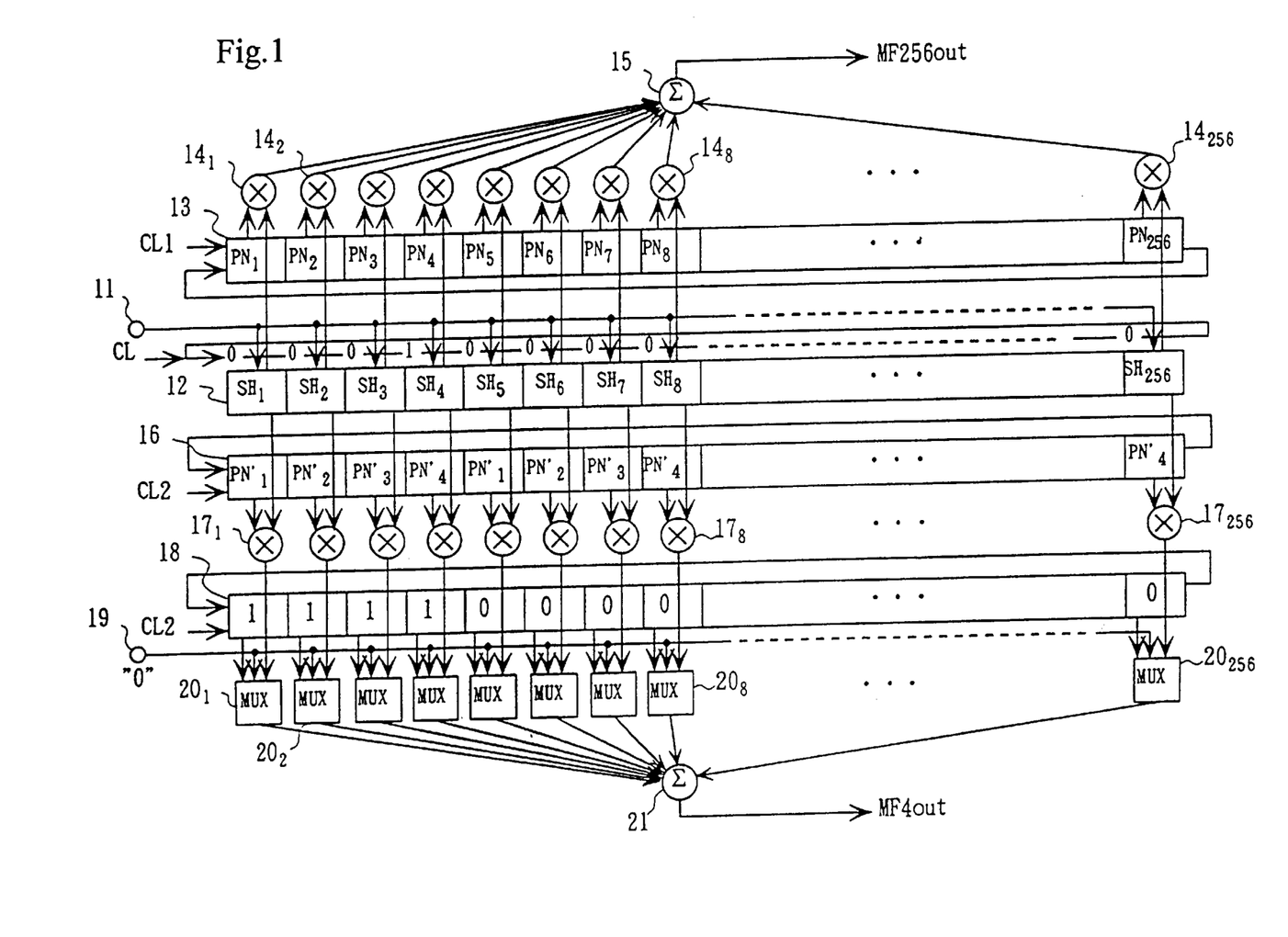
FIG. 1 is a block diagram showing a first embodiment of a matched filter bank according to the present invention.

FIG. 1 is a block diagram showing a first embodiment of a matched filter bank according to the present invention. In this matched filter bank, input signal samples are not shifted by a PN code sequence is shifted as well as circulated. The matched filter bank is available for correlation of whatever length of coefficient such as PN code sequence for despreading. The matched filter bank may include whatever number of matched filters. In this embodiment, there are two types of PN code sequences having lengths of 4 chips and 256 chips, respectively and there two types of matched filters corresponding to the respective PN code sequences.

In FIG. 1, 11 is an analog signal input terminal that receives a base band signal generated from a received signal through an antenna. 12 is a sampling and holding unit including a plurality, of sampling and holding circuits SH1 to SH256 which are commonly connected to the analog signal input terminal. The sampling and holding circuits receives the input signal in response to a control signal, shown by "1" and "0" above the unit 12, for sampling and holding when the signal is "1". The control signal is shifted rightwardly every sampling clock CL.

At first, the control signal for the first stage sampling and holding circuit SH1 is "1" so that the analog input signal from the terminal 11 is held by SH1. At the next sampling timing, the control signal for the second sampling and holding circuit SH2 becomes "1", and the other control signal are "0". Thus, the second sampling and holding circuits SH2 receives the input signal. The input signals is received by the sampling and holding circuits Sh3, SH4, . . . one after another. After the least sampling and holding circuit SH256 receives the analog input signal, the sampling starts from the first stage SH1 again.

13 is a first PN code register which stores 256 chips of a first PN code sequence (PN1 to PN256), in this embodiment. The PN code register is a circulating shift register which shifts data with circulation in response to a shift clock CL1 synchronous to the sampling clock CL. The data are shifted every sampling timing. $14_1$ to $14_{256}$ are multiplication circuits for multiplying outputs from the total stages of the PN code register 13 and outputs from the total sampling and holding circuits SH1 to SH256.

Since the 256 chips data stored in the stages of the PN code register 13 are usually digital data, the multiplication circuits $14_1$ to $14_{256}$ are analog-digital multiplication circuits each of which multiply the analog input signal by a digital data. Such analog-digital multiplication circuit has already proposed by the inventors of the present invention.

15 is an analog adder for summing outputs from the multiplication circuits $14_1$ to $14_{256}$. A correlation is output of the received signal samples of the number of 256 in the sampling and holding unit 12 with 256 chips PN code sequence in the PN code register 13. The analog-digital multiplication circuit proposed by the present inventors is advantageous with respect to a electric power consumption and a calculation accuracy.

After the starting of the operation, the analog signals input to the input terminal 11 are successively sampled Id held by the sampling and holding circuits SH1 to SH256. When 256 sampling clocks are input to the sampling and holding unit 12, the total 256 sampling and holding circuits SH1 to SH256 are filled with the 256 signal samples. At this time, the multiplication circuits $14_1$ to $14_{256}$ multiply the samples (S1 to S256) in the sampling and holding circuits SH1 to SH256 by the PN codes PN1 to PN256, and a total summation of (PN1×S1+PN2×S2+ . . . +PN256×S256) is calculated.

When a pulse of the $257^{th}$ sampling clock CL is input to the sampling and holding unit 12, the oldest data in the sampling and holding circuit SH1 is substituted by a new sample S257. Synchronously to the sampling of the sample S257, one shift clock CL1 is input to the PN code register 13 so that the PN code register 13 shift the codes rightwardly by one stage. Then, PN256 is held in the first stagy PN1 is held in the second stage, PN2 is held in the third stage, and generally PNi (i<255) is held in the (i+1)th stage. The adder 15 outputs, $$(PN256 \times S257 + PN1 \times S2 \ldots + PN255 \times S256).$$

Thereafter, analog input signals are sampled successively by the sampling and holding circuits SH2 to SH256 one after another every inputs of the sampling clock CL, synchronously therewith, the PN code in the PN code register 13 is shifted and circulated every inputs of the shift clock CL1. The correlation results of the input signal samples and the PN code sequence are successively outputs from the adder 15.

16 is a second PN code register including 256 stages, which calculates correlation by a periodic PN code sequence of a period of 4 chips. A 4 chips PN code sequence (PN'1 to PN'4) is repeatedly stored in the PN code register 16. The PN codes PN'1 to PN'4 are stored in the first to the fourth stages, and in the fifth to eighth stages. Similarly, four chips PN code sequences are store in every four stages following to the eighth stage. A second shift clock CL2 is input to the second PN register which shifts the PN code rghtwardly as well as circulates the PN code. The second shift clock CL2 is the same clock as the first shift clock CL1.

$17_1$ to $17_{256}$ are analog-digital multiplication circuits that multiply the PN codes in the PN code register 16 and the input signal samples stored in the sample hold unit 12.

18 is a circulation type mask register of 256 stages as shown in the FIG. 1. "1" is stored in continuous four stages of the mask register 18, and "0" is stored in other stages. These data are shifted rightwardly. In this embodiment, "1" is stored in the $253^{th}$ to $256^{th}$ stages and "0" is store in the first to the $252^{th}$ stages. When the shift clock CL2 is input four times to the register 18, "1" is moved to the first to the fourth stages and other stages are filled with "0".

Outputs of stages of the mask register 18 are input to corresponding multiplexers MUX $20_1$ to $20_{256}$ as control signals.

19 is an input terminal of constant "0" signal for inputting "0" to an analog adder 21. The multiplexers MUX $20_1$ to $20_{256}$ selectively output outputs of the multiplication circuits $17_1$ to $17_{256}$ or the "0" signal through the terminal 19 in response to the control signals of the mask register 18. When the control signal is "1", each multiplexer ($20_1$ to $20_{256}$) outputs the output from the corresponding multiplication circuit ($17_1$ to $17_{256}$), and when "0", each multiplexer outputs the "0" signal through the terminal 19.

21 is an analog adder for summing the outputs from the mulatiplexers MUX $20_1$ to $20_{256}$ up so as to output a correlation between the four chips PN codes and four samples of the received signal sample.

As mentioned above, "1" is stored in continuous four stages of the mask register 18, and the multiplexers ($20_1$ to $20_{256}$) corresponding to these stages output the outputs of the corresponding multiplication circuits ($17_1$ to $17_{256}$) to the adder 21. The multiplexers ($20_1$ to $20_{256}$) corresponding to the stages storing "0" output signals corresponding the "0" signal from the terminal 19. Therefore, the adder 21 outputs the total summation of the outputs of the above four multiplication circuits corresponding to the four chips.

When the sampling clock CL is input four times from the beginning, the received signal samples (S1 to S4) are stored in the sampling and holding circuits SH1 to SH4 of the sampling and holding unit 12. These samples are multiplied by the PN codes PN'1 to PN'4 that are stored in the first to fourth stages of the PN code register 16, in the multiplication circuits $17_1$ to $17_4$. The mask register 18 stores "1" in the first to fourth stages and "0" in other stages. The multiplexers $20_1$ to $20_4$ select the corresponding outputs of the multiplication circuits $17_1$ to $17_4$, and the other multiplexers $20_5$ to $20_{256}$ select the constant input "0" through the terminal 19. The adder outputs the total summation (S1·PN'1+S2·PN'2+S3·PN'3+S4·PN'4)

of the outputs of the multiplication circuits $17_1$ to $17_4$.

By the next sampling clock CL, a fifth received signal sample (S5) is stored. Simultaneously, the clock CL2 is input once, the PN codes in the registers 16 and 18 are shifted rightwardly by one stage. Then, the outputs of the multiplication circuits $17_2$ to $17_5$ are selected by the mutilplexers $20_2$ to $20_5$, the other multiplexes $20_1$ and $20_6$ to $20_{256}$ output "0". The multiplication circuit $17_2$ outputs the multiplication result of the second sample (S2) and the code (PN'1) in the second stage of the PN code register 16, the multiplication circuit $17_3$ outputs the multiplication result of the third sample (S3) and the code (PN'2), the multiplication circuit $17_4$ outputs the multiplication result of the sample (S4) and the code (PN'3), and the multiplication circuit $17_5$ outputs the multiplication result of the sample (S5) and the code (PN'4). The total summation of these multiplication results is output from the adder 21. Thereafter, synchronously to the clocks CL and CL2, the correlation outputs between the received signal samples and the 4 chips PN codes PNM'1 to PN'4 are output from the adder 21 similarly to the above. After the $256^{th}$ sampling clock CL and the sampling and holding circuit SH256 stores the $256^{th}$ signal sample, a $257^{th}$ signal sample (S257) is stored in the first sampling and holding circuit SH1 in response to the $257^{th}$ sampling clock CL, and a correlation is output from the adder 21.

By means of the sampling and holding unit 12, the PN code register 16, the multiplication circuits $17_1$ to $17_{256}$, multiplexers $20_1$ to $20_{256}$ and the adder 21, the correlation output of four chips can be obtained.

As mentioned above, in the first embodiment, the sampling and holding unit 12 is commonly used by the matched filters of 256 chips and 4 chips. The circuit size is smaller than a matched filter bank having independent sampling and holding units corresponding to the total matched filters. The electrical power consumption is decreased.

The samples of the input analog signal are not shifted in the sampling and holding unit, but the digital PN codes are shifted with circulation, a transfer error of the samples is reduced.

However, the first embodiment is applied to two chips spreading ratios of 256 chips and 4 chips, three or more spreading for example, 256 chips, 128 chips, 64 chips, 32 chips, 16 chips, 8 Chips and 4 Chips etc. can be processed by one common sampling and holding unit. There are seven matched filters connected to the common sampling and holding unit. The more the matched filters are connected to one common sampling and holding unit, the less the circuit size becomes relative to the number of matched filters.

The stages of the PN code register is 256 in the above embodiment, however, the number of stages can be changed according to the number of chips of the PN code sequence.

A second embodiment of the matched filter bank is described with reference to FIG. 2. The second embodiment is different from the first embodiment only in that the sampling and holding unit 12 is substituted by a sampling shift register 32 which is commonly used for a plurality of PN code sequences. Two PN code sequences of 256 chips and 4 chips are described similar to the first embodiment.

Figure 2:
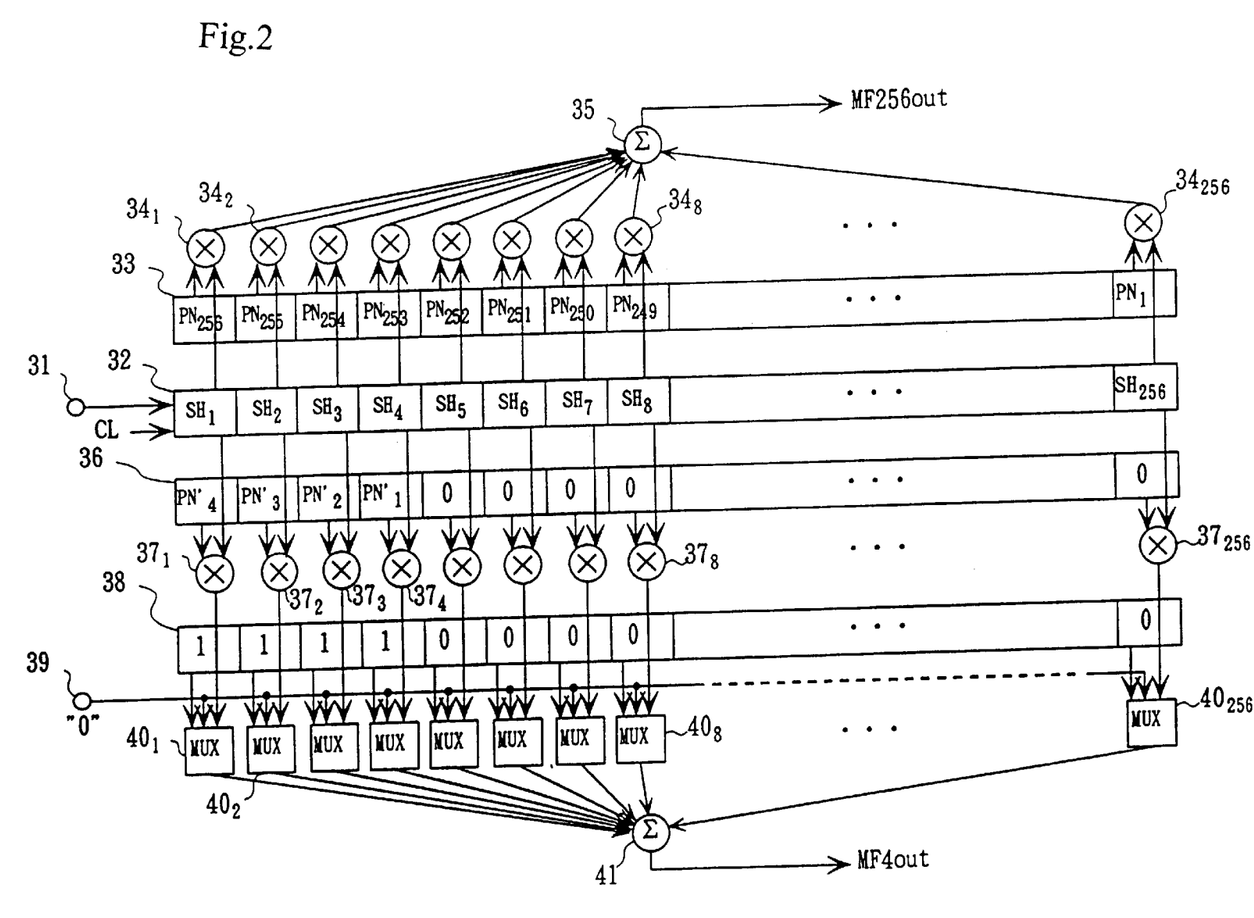
FIG. 2 is a block diagram showing a second embodiment of a matched filter bank according to the present invention.

In FIG. 2, 31 is an analog signal input terminal, and 32 is a sampling shift register consisting of a plurality of stages SH1 to SH256. The sampling shift register 32 samples an analog signal input from the input terminal 31 and shifts the sampled data from leading stage to trailing stage. 33 is a first PN code register which stores 256 chips of a first PN code sequence (PN1 to PN256), in this embodiment. $34_1$ to $34_{256}$ are multiplication circuits for multiplying outputs from the total stages of the shift register 32 by the PN code (PN1 to PN256) in the PN code register 33. Since the data sampled by and output from the stages of the sampling shift register 32 are analog data, and the PN codes (PN1 to PN256) stored in the stages of the sampling shift register 32 are digital data, the multiplication circuits $34_1$ to $34_{256}$ are analog-digital multiplication circuits each of which multiply the analog input signal by a digital data.

35 is an analog adder for summing outputs from the multiplication circuits $34_1$ to $34_{256}$ up. A correlation is output from the adder 35, of the received signal samples of the number of 256 in the sampling shift register 32 with 256 chips PN code sequence in the PN code register 33.

The analog signals input to the input terminal 11 are successively sampled by the first stage sampling and holding circuit SH1 and transferred toward the last stage in response to the sampling clock CL. When 256 sampling clocks are input to the sampling shift register 32, the first sampled signal (S1) is stored in the $256^{th}$ last stage SH256. At this time, the $256^{th}$ input signal sample is multiplied in the multiplication circuit $34_1$ by the $256^{th}$ PN code PN256 stored in the first stage of the register 33. In the multiplication circuits $34_2$, $255^{th}$ input signal sample S255 is multiplied by the $255^{th}$ PN code PN255. Similarly, the first sample S1 is multiplied by the first PN code PN1. The adder 35 outputs the correlation, as follows:

(PN1×S1+PN2×S2+. . . +PN256×S256)

When a pulse of the $257^{th}$ sampling clock CL is input to the sampling shift register 32, the $257^{th}$ sample S257 is stored in the first stage of the sampling shift register 32, and the second sample is stored in the last stage SH256. The adder 15 outputs, (PN1×S2+PN2×S3+. . . +PN256×S257).

Thereafter, the correlation results of the samples of the input signal through the input terminal 31 and the PN code sequence are successively outputs from the adder 35.

36 is a second PN code register including 256 stages, similar to that in the first PN code register 33. In this embodiment, PN code sequence of a period of 4 chips is stored in the second PN code register 36. The PN codes PN'1 to PN'4 are stored in the fourth to the first stages, in this order, and "0" is stored in the other stages including the fifth stage. $37_1$ to $37_{256}$ are analog-digital multiplication circuits that multiply the PN codes in the second PN code register 36 and the input signal samples stored in the sample hold circuits SH1 to SH256.

38 is a circulation type mask register of 256 stages. Outputs from the total stages of the mask register 38 are selection control signals for multiplexers $40_1$ to $40_{256}$. "1" is stored in the first to fourth stages in the mask register 38, and "0" is stored in the fifth to $256^{th}$ stages. 39 is an input terminal of constant "0" signal for inputting "0". The multiplexers MUX $40_1$ to $40_{256}$ selectively output outputs of the multiplication circuits $37_1$ to $37_{256}$ or the "0" signal through the terminal 39 in response to the control signals of the mask register 38. When the control signal is "1", each multiplexer ($40_1$ to $40_{256}$) outputs the output from the corresponding multiplication circuit ($37_1$ to $37_{256}$), and when "0", each multiplexer outputs the "0" signal through the terminal 39. 41 is an analog adder for summing the outputs from the mulatiplexers MUX $40_1$ to $40_{256}$ up.

When the sampling clock CL is started to be input to the analog shift register 32, the analog signals from the input terminal 31 are successively sampled and held by the sampling and holding circuits SH1, and are shifted toward the last stage. When the sampling clock CL is input four times, the input signal samples S1, S2, S3 and S4 are stored in the sampling and holding circuits SH4, SH3, SH2 and SH1, respectively. At this time, the multiplication circuits $37_4$ to $37_1$ output PN'1×S1, PN'2×S2, PN'3×S3 and PN'4×S4, and the multiplication circuits $37_5$ to $37_{256}$ output "0" because data in the corresponding stages of the PN code register 36.

As mentioned above, "1" is stored in the first and fourth stages in the mask register 38 and "0" is stored in stages from the fifth to the last. The multiplexers $40_1$ to $40_4$ select the outputs from the corresponding multiplication circuits $37_1$ to $37_4$, and the other multiplexers $40_5$ to $40_{256}$ output signals corresponding to "0" from the "0" signal input terminal 39. Multiplication results of the multiplication circuits 371 to 374 and (256-4) "0"s from the "0" signal input terminal 39 are input to the adder 41, and a total summation of multiplication results (PN'1×S1+PN'2×S2+PN'3×S3+PN'4×S4) is output.

When a pulse of the fifth sampling clock CL is input to the sampling and holding unit 32, a fifth input signal sample S5 is stored in the sampling and holding circuit SH1, S4 in SH2, S3 in SH3, S2 in SH4 and S1 in SH5. At this time, the multiplication circuit $37_1$ calculates PN'4×S5, the multiplication circuit $37_2$ calculates PN'3×S4, the multiplication circuit $37_3$ calculates PN'2×S3, the multiplication circuit $37_4$ calculates PN'1×S2. The calculation results of the multiplication circuits $37_5$ to $37_{256}$ are "0" because the data corresponding to these multiplication circuits are "0". Thus, the adder 41 outputs (PN'1×S2+PN'2×S3+PN'3×S4+PN'4×S5). Thereafter, the adder 41 outputs correlation output of input signal samples and the second PN code sequence having a period of 4 chips.

As mentioned above, the analog sampling shift register 32 is commonly used by the matched filters of 256 chips and 4 chips.

When the PN code has other periods of "m" chips than 4 chips, PN code PN'm to PN'1 are stored in the first to the $m^{th}$ stages, and "0" is stored in the other stages including the fifth stage. "1" is stored in the first to the $m^{th}$ stages and "0" in the other stages of the mask register 38. Therefore, any periods of PN code are available. The stages of the PN code register is 256 in the above embodiment, however, whatever number of stages can be applied.

In the above embodiment, the analog shift register 32 is used, which shift the input signal samples as analog signals, however, it is also possible to convert the input signal samples into digital data and shift the digital data. In this case, the multiplication is digital by digital. The multiplication circuits $34_1$ to $34_{256}$ are digital multiplication circuits. The outputs of the multiplication circuits $37_1$ to $37_{256}$ are input through the multiplexers $40_1$ to $40_{256}$, which are controlled by the mask register 38, to the adder 41.

Figures 3, 4:
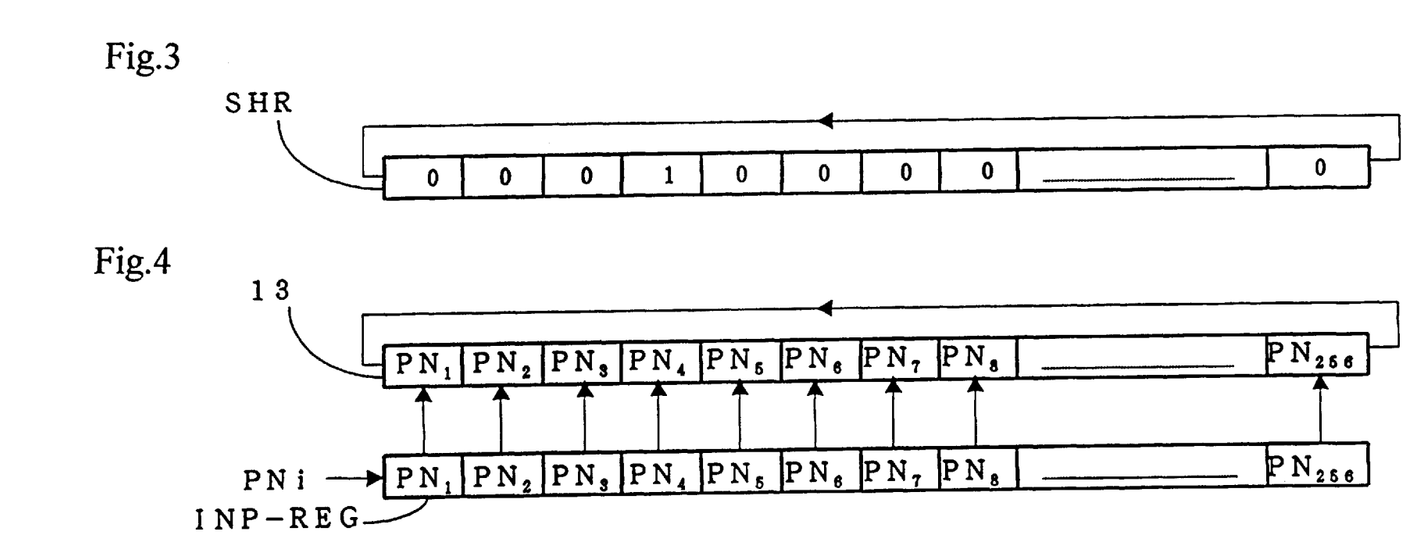
FIG. 3 is a block diagram showing sampling and holding register in the first embodiment.
FIG. 4 is a block diagram showing a PN register in the first embodiment.

FIG. 3 shows a sampling and holding register SHR as a sampling and holding control circuit for the sampling and holding unit in FIG. 1. The sampling and holding register SHR is a circulation shift register similar to the sampling and holding circuit for storing one "1" and 255 "0"s. The data are shifted and circulated synchronously to the sampling and holding timing. The data "1" is the control signal for sampling.

In FIG. 4, an input PN register INP-REG of same number of stages as the PN code register 13 is connected to the PN code register 13 (FIG. 1) at the corresponding stages. The input PN register INP-REG is a shift register for transferring the coefficient data PNi toward the last stage. When a correlation is calculated by a PN code at a symbol period, the next PN code sequence of the next symbol period is input to the input PN register INP-REG which is transferred to the PN code register just before the next symbol period. The PN code is quickly loaded by the preparation in the input PN register. It is particularly effective for successive loading of long code by one symbol period. FIG. 3 shows a status just after the transfer that the same data is stored in PN code register as the data in the input PN register. The clock input can be set independently from the sampling clock, so a quick data input is also possible.

Figure 5:
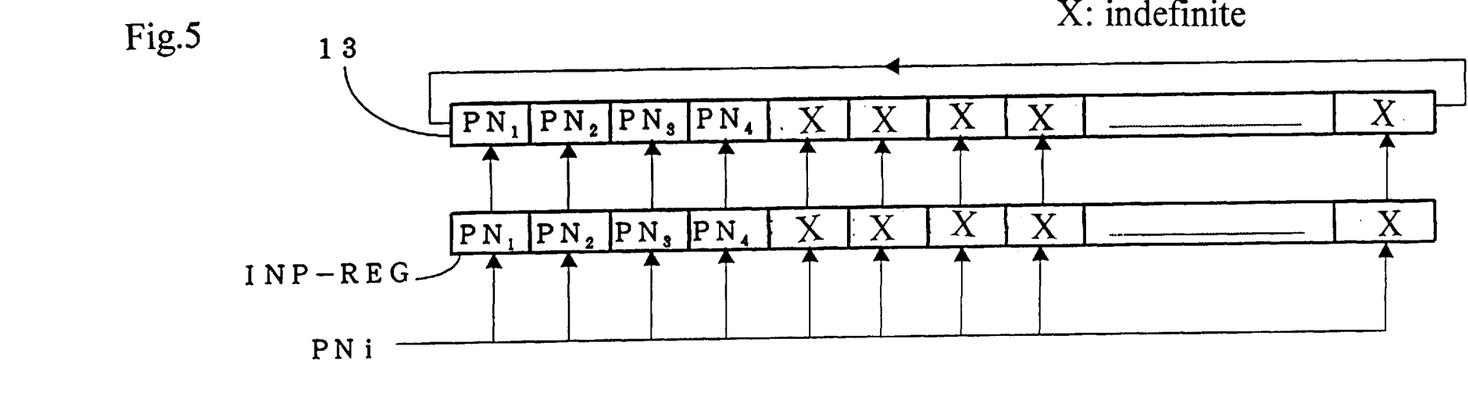
FIG. 5 is a block diagram of the PN register to which another multipliers are input.

FIG. 5 shows a variation of the input PN register consisting of a plurality of parallel latches. The data are parallelly input to these latches, and any of the latches receives the data in response to the clock signals CK1 to CK256. The receiving is controlled by the data "1" or "0" in the sampling and holding register of the sampling land holding taps. When "1", data is received, when "0", data is not received. In Fif.5, 4 data is used. When the first tap of the sampling and holding register SHR stored "1" and the other taps store "0", the input of at the first chip is input to the first tap of the INP-REG. At the fourth clock, the fourth tap of SHR becomes "1" and the other taps become "0". The fourth tap input is input to the fourth tap of the INP-REG. The addition is performed for four samples according to the control of the mask register in FIG. 1, other data may be infinite.

Figure 6:
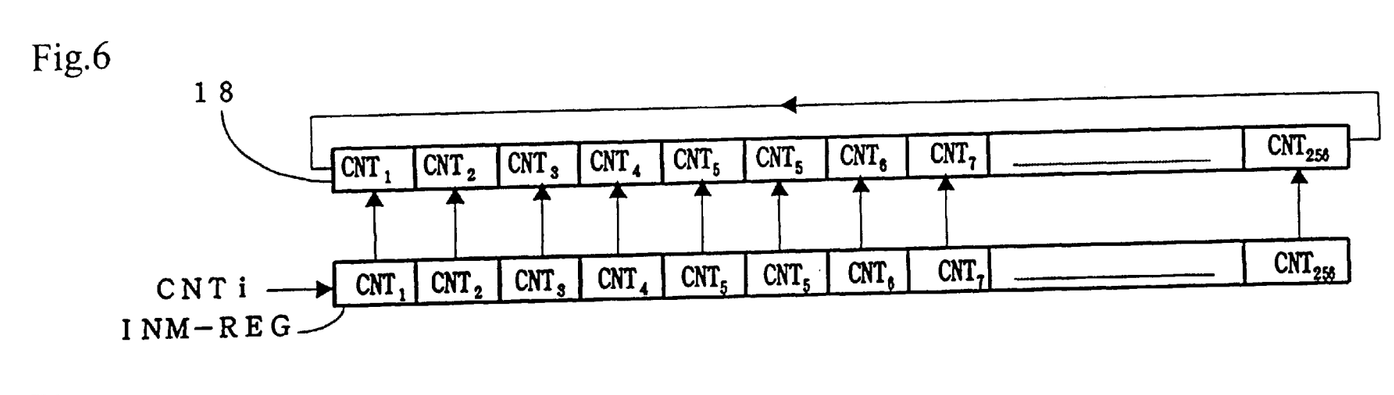
FIG. 6 is a block diagram of showing a mask register and an input register.

In FIG. 6, an input mask register INM-REG of same number of stages as the mask register 18 is connected to the mask register 18 (FIG. 1) at the corresponding stages. The input mask register INM-REG is a shift register for transferring control signals CNT from the first stage toward the last stage. When the addition is controlled by the mask register 18 at a symbol period, the next control signals of the next symbol period is input to the input mask register INM-REG which is transferred to the mask register just before the next symbol period. The control signals are quickly loaded by the preparation in the input mask register. The clock input to the input mask register can be set independently from the sampling clock CL, so a quick data input is also possible.

Figure 7:
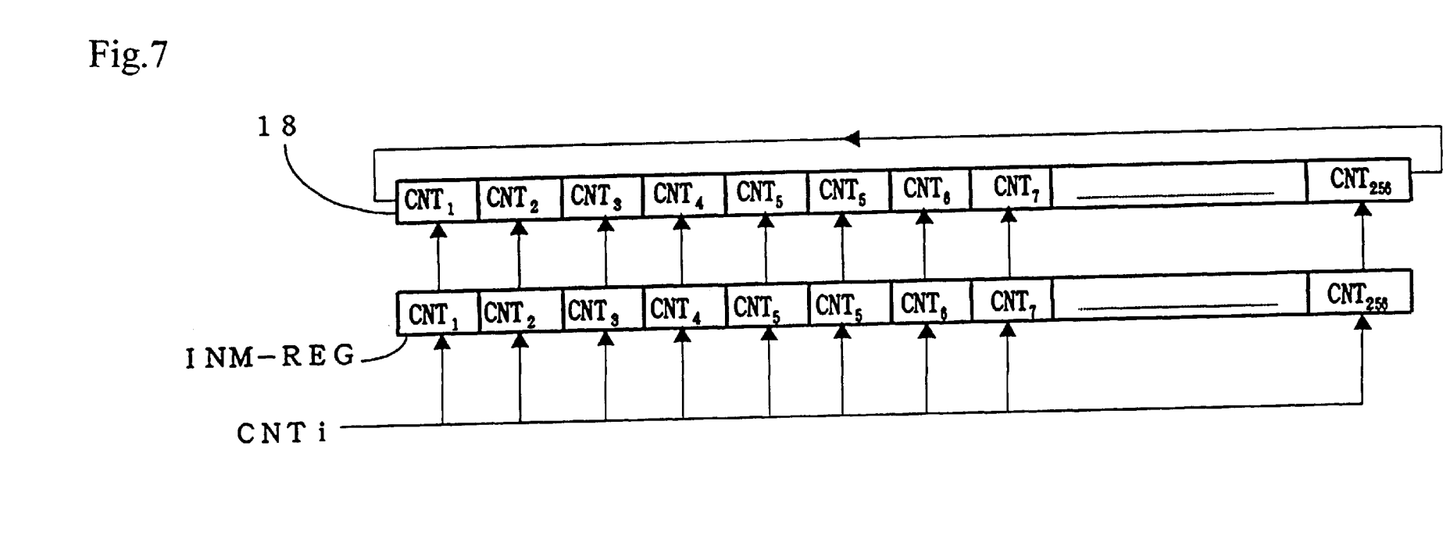
FIG. 7 is a block diagram showing a variation of a mask register.

FIG. 7 shows a variation of the input mask register (FIG. 6) consisting of a plurality of parallel latches. The control signal input lines are parallelly connected to stages of the input mask register, each latch tap receives the data in response to the control signal of the sampling and holding register SHR. When the addition is controlled by the mask register 18 at a symbol period, the next control signals of the next symbol period is input to the input mask register INM-REG which is transferred to the mask register just before the next symbol period. The control signals are quickly loaded at any timing by the preparation in the input mask register. FIG. 6 shows a status just after the transfer of the control signal that the same data is stored in the mask register as the data in the input mask register.

Figure 8:
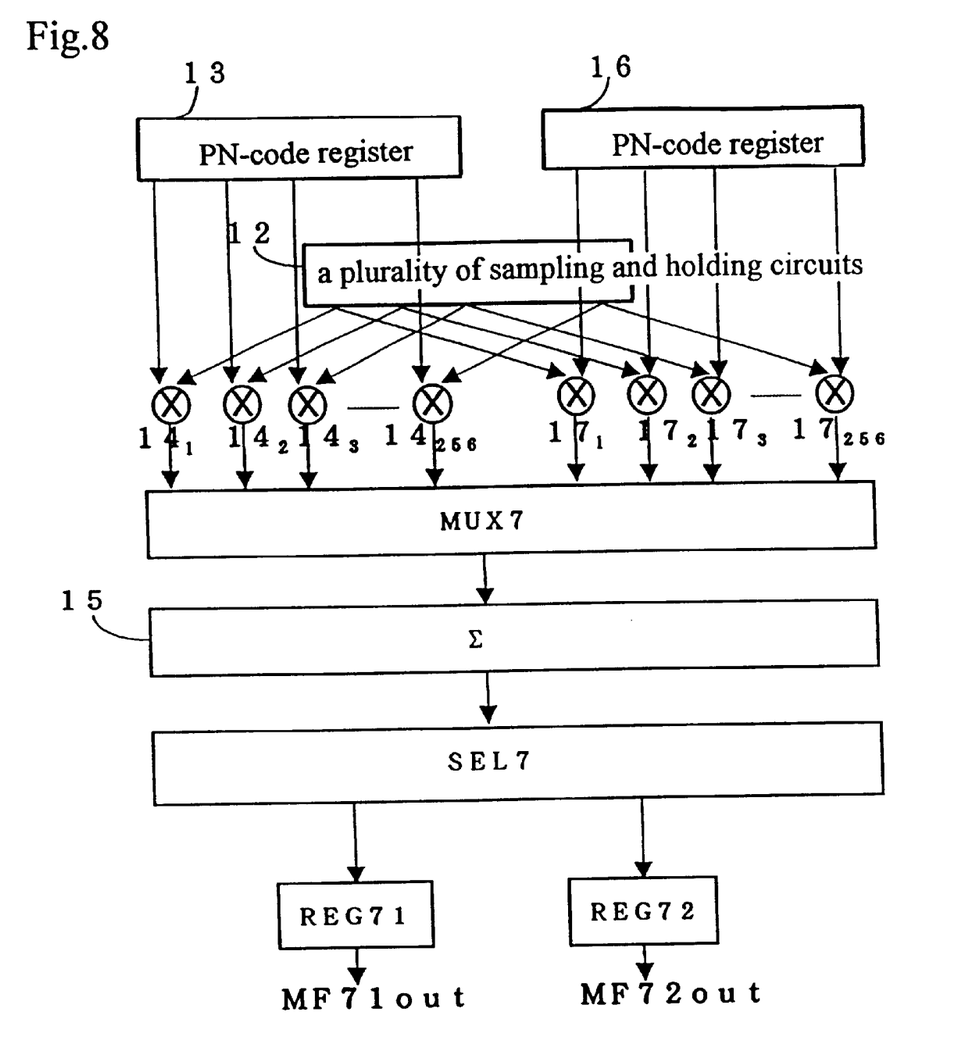
FIG. 8 is a block diagram showing a third embodiment of a matched filter.

FIG. 8 shows a third embodiment of the matched filter circuit in which one adder 15 is commonly used for processes by a plurality of PN code registers 13 and 16, differently from the circuit in FIG. 1. The outputs from multiplication circuits $14_1$ to $14_{256}$ and the outputs from multiplication circuits $17_1$ to $17_{256}$ are input to a multiplexer MUX7 which selectively outputs the outputs from the multiplication circuits $14_1$ to $14_{256}$ or $17_1$ to $17_{256}$ to an adder 15. Therefore, one adder can be commonly used for a plurality of multiplication results and the circuit size becomes small. The more the number of multiplication circuits selected, the smaller the circuit size becomes with respect to the total function. However, the number of selectable multiplication circuits are limited for outputting the total multiplication results within one tip time because the matched filter output must be obtained at the same timing.

An output of the adder 15 is input to a selector SEL7 outputs of which are connected to analog registers REG71 and REG72 corresponding to the groups of multiplication circuits $14_1$ to $14_{256}$ and $17_1$ to $17_{256}$. The selector 17 inputs the outputs from the multiplication circuits $14_1$ to $14_{256}$ to the register REG71, and inputs the outputs from the multiplication circuits $17_1$ to $17_{256}$ to the register REG72. The multiplication results are held and are available at rather redundant timing as matched filter outputs MF71out and MF72out.

In the above embodiments, the PN code sequences have different code lengths, however, the matched filter bank according to the present invention is applicable to different PN code sequences of the same length.

Any other calculation of a plurality of correlation results, than the despreading for DS-CDMA communication system, can be performed by the matched filter bank above.

The matched filter bank above is a real number type, however, it is readily applicable to complex number type.

Next, an embodiment of an inverting amplifier circuit used in the multiplication circuits of the matched filter bank above is described with reference to FIG. 9.

Figure 9:
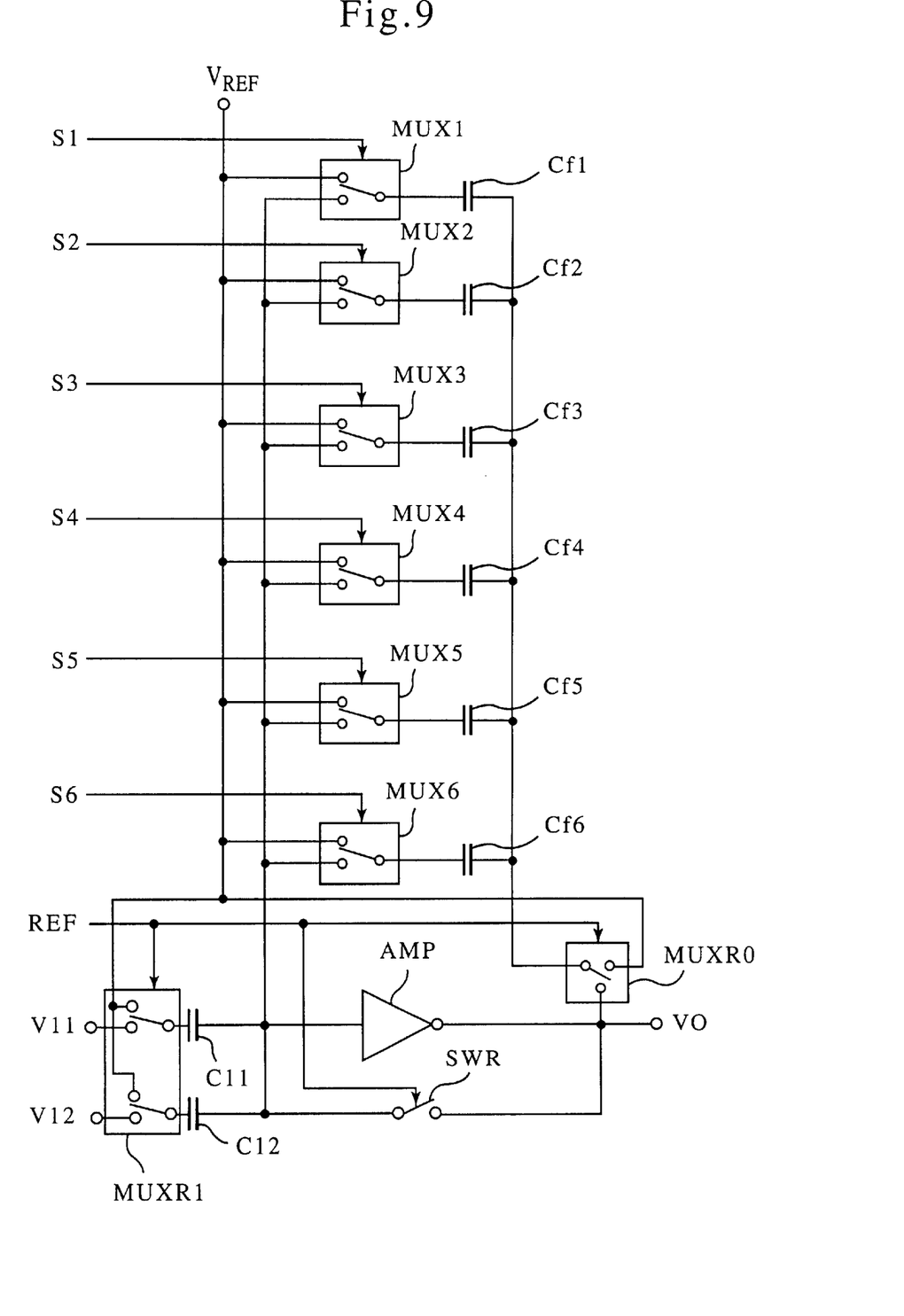
FIG. 9 is a block diagram showing an inverting amplifier with a variable gain.

In FIG. 9, the inverting amplifier circuit is variable in its gain, that includes input capacitances CI1 and CI2 for receiving input voltages VI1 and VI2, respectively. Outputs of the capacitances CI1 and CI2 are commonly connected to an input of an amplifier AMP. The amplifier AMP is an inverting amplifier consisting of an operational amplifier connected at an inverting input with the capacitances CI1 and CI2, of a serial circuit of odd number of CMOS inverters or of any other circuits of inverting amplifier. A plurality feedback capeitances Cf1 to Cf6 are connected between input and output of the amplifier AMP, outputs of which are commonly connected to a refresh switch MUXRO. Inputs of the feedback capacitances Cf1 to Cf6 are connected to feedback multiplexers MUX1 to MUX6, respectively, for connecting the feedback capacitances Cf1 to Cf6 to the input of the amplifier AMP or a reference voltage Vref. An amplifier refresh switch SWR is connected between the input and the output of the amplifier AMP for short-circuiting the input and output of the amplifier AMP. A refresh switch MUXR1 is connected to the inputs of the input capacitances CI1 and CI2 for selecting the input voltages VI1 and VI2 or the reference voltage Vref. Vref is selected when refreshing. The multiplexers MUX1 to MUX6 are switched in response to control signals S1 to S6 for controlling the validity of the feedback capacitances Cf1 to Cf6. The inputs of the feedback capacitances Cf1 to Cf6 are disconnected from the floating node of the amplifier and connected to the reference voltage Vref, when invalidated. The invalid feedback capacitances have no influence to the input (floating node) of the amplifier AMP.

The refresh switch MUXRO is connected to the reference voltage Vref and the refresh switch is closed, when refreshing. The refresh switch MUXRI connects the reference voltage to the capacitances CI1 and CI2. An output performance of this embodiment is obtained, similarly to the formula (1), as in the formula (3).

$$VO2 = \frac{-VI1 \cdot CI1 - VI2 \cdot CI2 + V_{REF} \cdot (CI1 + CI2 + CVf)}{CVf + \frac{1}{A}(CI1 + CI2 + CVf)} \quad (3)$$

Figure 13:
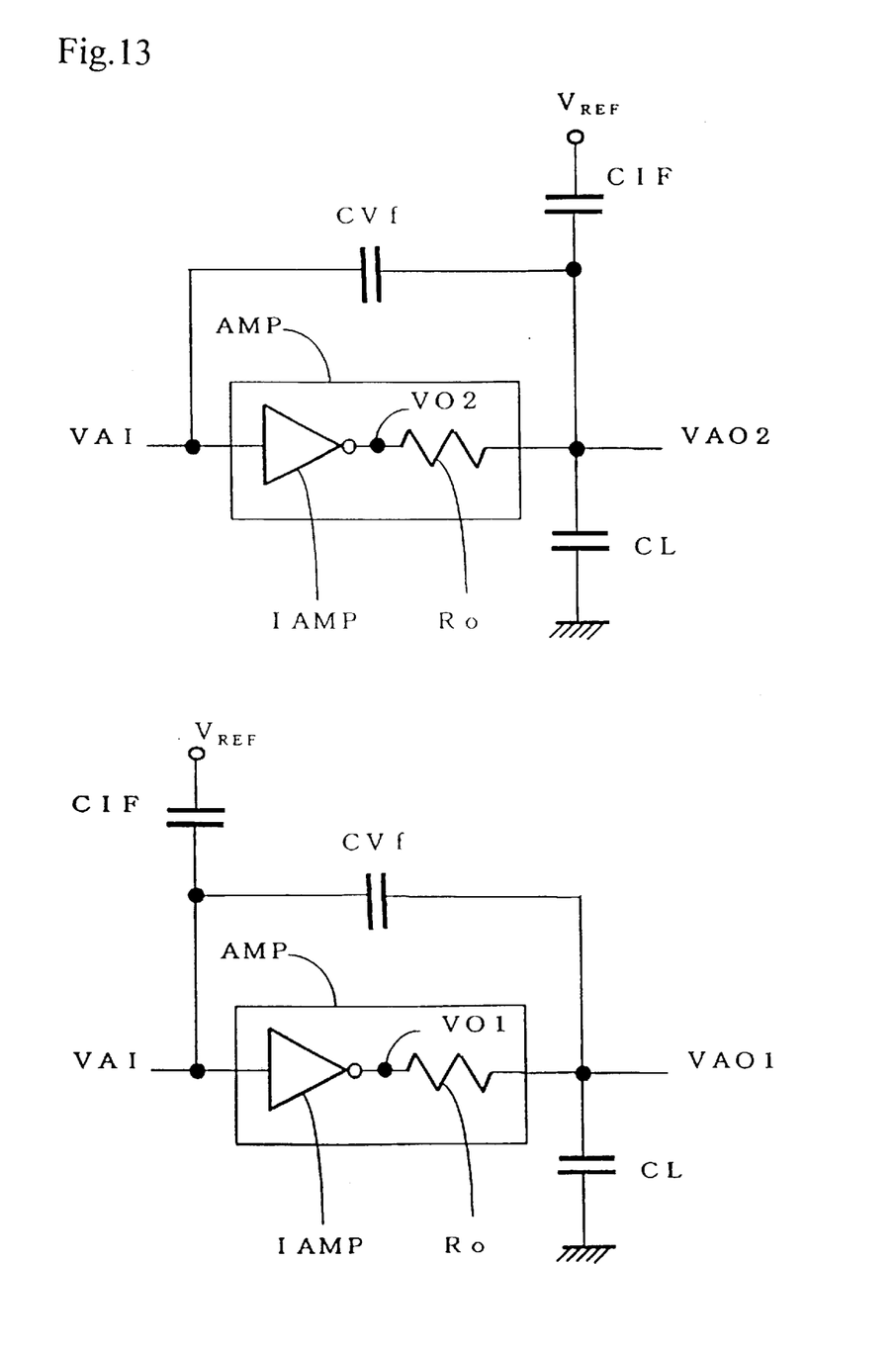
FIG. 13 is an equivalent circuit of a practical amplifier.

As will be understood from the formula (49, the composite capacity CIf of the invalid feedback capacitances disappears and the output accuracy is much improved. This is caused by disconnection of the invalid capacitances from the floating node. The invalid feedback capacitances are kept connected with the output of the amplifier AMP, differently from the conventional amplifier. As shown in FIG. 13, a practical amplifier is deemed as a circuit consisting of an ideal amplifier IAMP and a resistance Ro as an output impedance connected to an output of IAMP. When a load capacitance is CL, a relationship between the input VAI and the output VAOI1 is as in the formula (4).

$$VAO1 = \frac{VO1 \cdot Go + VAI \cdot s \cdot CVf}{Go + s \cdot CL + s \cdot CVf} \quad (4)$$

In the formula (4), "s" is the operator of Laplace-Transformation. As for FIG. 9, a similar formula is obtained when the input and output are VAI' and VAO2, respectively.

$$VAO2 = \frac{VO2 \cdot Go + VAI \cdot s \cdot CVf + V_{REF} \cdot s \cdot CIf}{Go + s \cdot CL + s \cdot Cf + s \cdot CIf} \quad (5)$$

A formula (6) is obtained from the formula (4) and (5).

$$\left|1 - \frac{VAO1}{VO1}\right| > \left|1 - \frac{VAO2}{VO2}\right| \to 0 \text{ また } \frac{VO1}{VO} < \frac{VO2}{VO} < 1 \quad (6)$$

Therefore, the circuit in FIG. 9 has less errors than the conventional circuit. Since the refresh switches provided in the conventional circuit (FIG. 12) are unnecessary, the circuit size becomes small.

When the gain of the circuit in FIG. 9 is expressed by a finite gain-bandwidth (GB) product, a settling time of the circuit is as in the formula (7).

$$A(s) \cong \frac{GB}{s} \quad (7)$$

The formulae (2) and (3) are substituted by the formula (7), and the formulae (8) and (9) are obtained.

$$VO1 = \frac{-VI1 \cdot \frac{CI1}{CVf} - VI2 \cdot \frac{CI2}{CVf} + V_{REF} \cdot \frac{(CI1+CI2+CVf)}{CVf}}{1+s \cdot \frac{CI1+CI2+CVf+CIf}{CVf \cdot GB}} \quad (8)$$

$$VO2 = \frac{-VI1 \cdot \frac{CI1}{CVf} - VI2 \cdot \frac{CI2}{CVf} + V_{REF} \cdot \frac{(CI1+CI2+CVf)}{CVf}}{1+s \cdot \frac{CI1+CI2+CVf}{CVf \cdot GB}} \quad (9)$$

The settling time τ of indicial response is expressed by a rise time $\tau_r$, an output voltage delay and a slew rate SR, as in the formula (10).

$$\tau \cong \frac{\Delta Vo}{SR} + \tau_r = \tau_d + \tau_r \quad (10)$$

Here, $\tau_r$ is a delay time due to SR. When a phase compensation capacity is Cp and the maximum supply current is Io, SR is given by the formula (11).

$$SR = \frac{Io}{Cp+CL} \times 10^{-6} \ [V/\mu \ \text{sec}] \quad (11)$$

The first term of the right side in the formula (10) is a constant. A first order transfer function H(s) is as in the formula (12).

$$H(s) = \frac{1}{1+sp1} \quad (12)$$

The rise time $\tau_r$ is approximately equal to p1 in the formula (12), as shown in the formula (13).

$$\tau_r \approx p1 \quad (13)$$

Comparing the formulae (8), (9) and (10), it will be understood that the rise time $\tau_r$ can be evaluated from comparison of the operator "s" in the formulae (8) and (9).

Parameters are set as in the Table 1 and the settling time is calculated.

TABLE 1

| Amplifier No. | Parameters | | | | | |
|---|---|---|---|---|---|---|
| | GB | Io | CIf | CVf | Cp | CI1 + CI2 | CL |
| S35AMP41 | 40.35 MHz | 120 μA | 1.8 pF | 0.6 pF | 0.2 pF | 2.4 pF | 0.5 pF |

When delay times $\tau_{d1}$, $\tau_{d2}$ and rise times $\tau_{r1}$, $\tau_{r2}$ are assumed, the formulae (14) to (18) are obtained.

$$\tau_{d1} = \frac{\Delta Vo1}{SR} = \frac{Cp+CL}{Io} = \frac{0.7 \times 10^{-12}}{120 \times 10^{-6}} = 5.83 \ [\text{nsec}] \quad (14)$$

$$\tau_{d2} = \frac{\Delta Vo2}{SR} = \frac{Cp+CL+CIf}{Io} = \frac{2.5 \times 10^{-12}}{120 \times 10^{-6}} = 20.83 \ [\text{nsec}] \quad (15)$$

$$\tau_{r1} = \frac{CI1+CI2+CVf+CIf}{CVf \cdot GB} = \frac{4.8}{0.6 \times 40.35 \times 10^6} = 198.26 \ [\text{nsec}] \quad (16)$$

$$\tau_{r2} = \frac{CI1+CI2+CVf}{CVF \cdot GB} = \frac{3}{0.6 \times 40.35 \times 10^6} = 123.92 \ [\text{nsec}] \quad (17)$$

The settling times $\tau_{r1}$, $\tau_{r2}$ are obtained as in the formulae (18) and (19).

$$\tau_1 = \tau_{d1} + \tau_{r1} = 5.83 + 198.26 = 204.09 [\text{nsec}] \quad (18)$$

$$\tau_2 = \tau_{d2} + \tau_{r2} = 20.83 + 123.92 = 144.75 [\text{nsec}] \quad (19)$$

The settling time $\tau_2$ becomes shorter relative to the conventional settling time $\tau_1$, as the composite capacity of the invalid capacitances increases. This is expressed by the formula (20).

$$CIf \uparrow \Rightarrow \Delta\tau = \tau_1 - \tau_2 \uparrow \quad (20)$$

Figure 11:
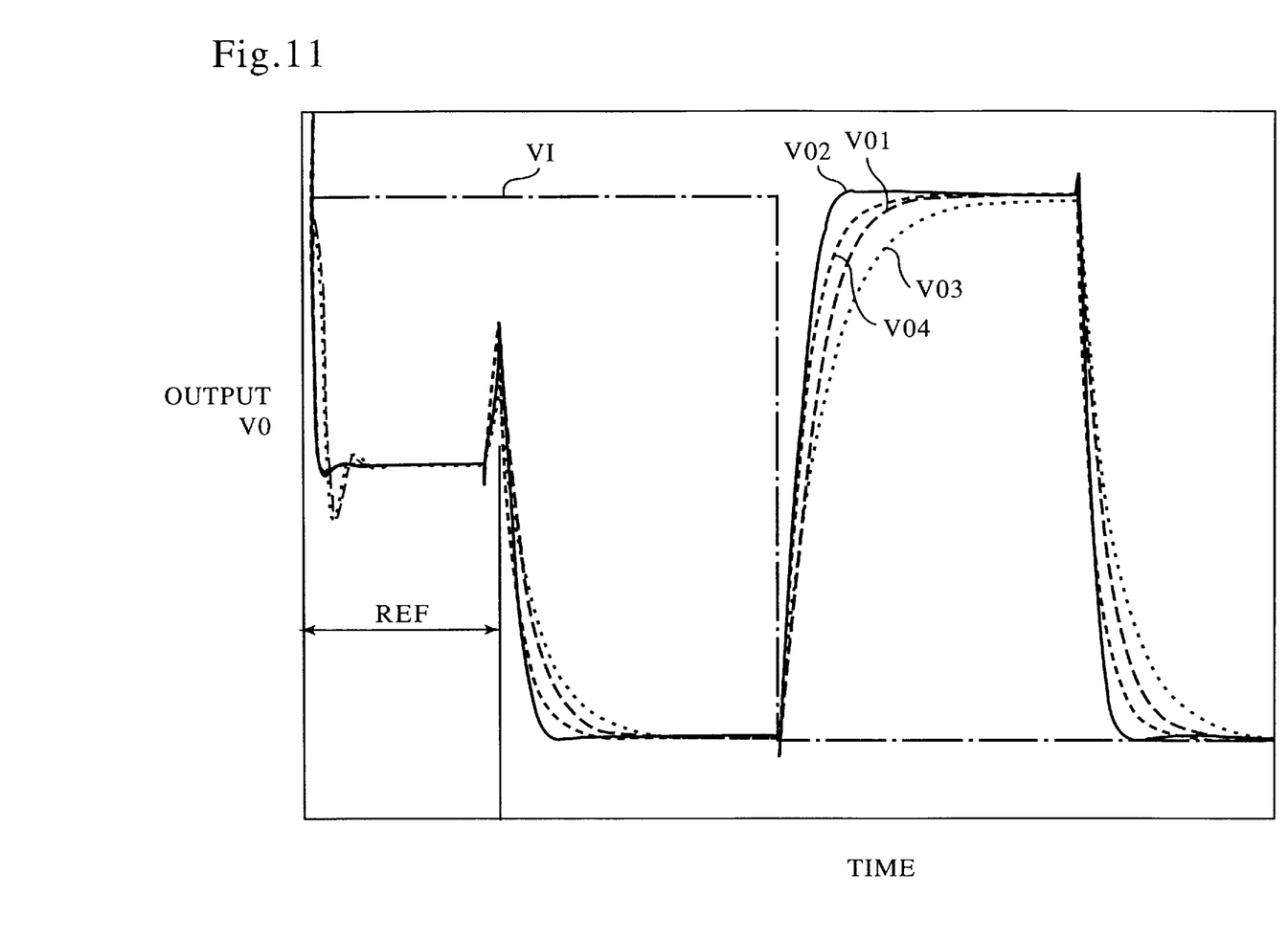
FIG. 11 is a graph showing an output characteristics of the circuit of FIG. 9 comparing with a conventional circuit.

FIG. 11 is a graph showing a transient response of the embodiment and the conventional circuit. Output voltages of the embodiment are shown by a solid line (Vo2) and a broken line (Vo1), output voltages of the conventional circuit are shown by a short broken line (Vo4) and a dotted line (Vo3). The output voltages Vo1 and Vo3 correspond to the composite capacity of the input capacitances of four unit capacitances and to the composite valid feedback capacity of four unit capacitances. The output voltages Vo2 and Vo4 correspond to the composite capacity of the input capacitances of eight unit capacitances and to the composite valid feedback capacity of eight unit capacitances. A one dot broken line (V1) is an input voltage and REF is a refresh period. The input voltage is maximum voltage, and the refresh period belong to a period of the maximum voltage. The settling times of Vo1 and Vo2 are shorter than those of Vo3 and Vo4, respectively.

Figure 10:
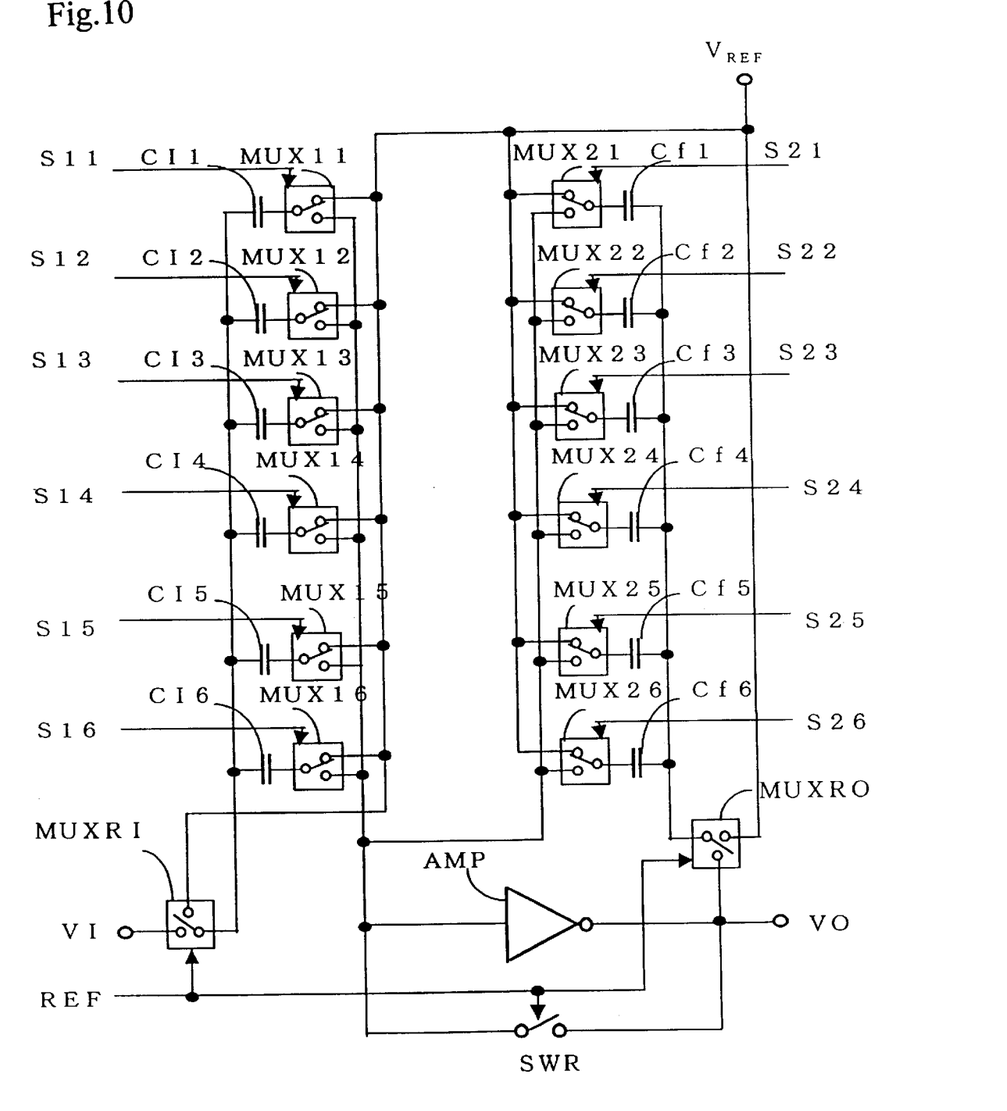
FIG. 10 is a block diagram showing a scaler circuit according to the present invention.

FIG. 10 is a scaler circuit based on the circuit in FIG. 9. The scaler circuit has input capacitances which are variable in the valid composite capacity so that a wide range gain change is possible. The same references are given to the similar components in FIG. 10 to those in FIG. 9.

In FIG. 10, a plurality of input capacitances CI1 to CI6 are commonly connected to an input voltage V1 through a refresh switch MUXRI. The refresh switch MUXR1 connects the inputs of the input capacitances CI1 to CI6 to the reference voltage Vref when refreshing, otherwise to the input voltage VI. Outputs of the input capacitances are connected to multiplexers MUX11 to MUX16, respectively, these multiplexers MUX11 to MUX16 are connected to an input of the amplifier AMP or the reference voltage Vref.

The multiplexers MUX11 to MUX16 are switched in response to control signals S11 to S16 for controlling the validity of the input capacitances CI1 to CI6. The outputs of the input capacitances CI1 to CI6 are disconnected from the floating node of the amplifier and connected to the reference voltage Vref, when invalidated. The invalid feedback capacitances have no influence to the input (floating node) of the amplifier AMP. Similarly to the circuit in FIG. 9, a plurality of feedback capacitances Cf11 to Cf16 are connected between input and output of the amplifier AMP, outputs of which are commonly connected to a refresh switch MUXRO. Inputs of the feedback capcitances Cf1 to Cf6 are connected to feedback multiplexers MUX21 to MUX26, respectively, for connecting the feedback capacitances Cf1 to Cf6 to the input of the amplifier AMP or a reference voltage Vref. An amplifier refresh switch SWR is connected between the input and the output of the amplifier AMP for short-circuiting the input and output of the amplifier AMP. A refresh switch MUXR1 is connected to the inputs of the input capacitances CI1 and CI2 for selecting the input voltages VI1 and VI2 or the reference voltage Vref. Vref is selected when refreshing. The multiplexers MUX21 to MUX26 are switched in response to control signals S21 to S26 for controlling the validity of the feedback capacitances Cf1 to Cf6. The inputs of the feedback capacitances Cf1 to Cf6 are disconnected from the floating node of the amplifier and connected to the reference voltage Vref, when invalidated. The invalid feedback capacitances have no influence to the input (floating node) of the amplifier AMP. When a composite capacity of input valid capacitances is CVI and a composite capacity of input invalid capacitances is CII, an output voltage VO of the scaler circuit is given by the formula (21).

$$VO = \frac{-VI \cdot CVI + V_{REF} \cdot (CVI + CVf)}{CVf + \frac{1}{A}(CVI + CVf)} \quad (21)$$

The scaler circuit above is accurate and of high speed similarly to the circuit in FIG. 9.

The amplifier AMP is an inverting amplifier consisting of an operational amplifier connected at an inverting input with the capacitances, of a serial circuit of odd number of CMOS inverters or of any other circuits of inverting amplifier.

In addition to the above embodiments, a circuit which is variable only in the composite input capacitance, and feedback capacitance is fixed.

The inverting amplifier of variable gain can be used not only for the matched filters above but also any other circuits using an inverting amplifier.

What is claimed is:

1. A matched filter bank comprising:
   a sampling and holding unit for sampling and holding successive input signals of a number of "m" (m: integer not less than 2);
   a plurality of PN code registers of a number of "n" (n: integer not less than 2), each said PN code register including a plurality of stages of number of "m" for storing coefficient data, each said PN code register being a shift register with circulation;
   a plurality of groups of multiplication circuits of said number of "n" corresponding to said PN code registers, each said group including a plurality of multiplication circuits of said number of "m" corresponding to said stages of each said PN code register, each said multiplication circuit multiplying an output of one of said sampling and holding circuit and an output of one of said PN code register; and
   one or more adders for adding selectively outputs of said multiplication circuits of a number corresponding to a length of said coefficient data.

2. A matched filter bank as claimed in claim 1, further comprising:
   a mask register of "m" stages which stores control signals for selecting said outputs of said multiplication circuits corresponding to said length of said coefficient data; and
   a plurality of multiplexers of said number of "m'" corresponding to said multiplication circuits of said number of "m", each said multiplexer selectively outputting said output of said corresponding multiplication circuit or "0",
   whereby said outputs from said multiplication circuits are selectively added corresponding to said length of said coefficient data.

3. A matched filter bank as claimed in claim 1, said sampling and holding unit comprising a plurality of sampling and holding circuits of said number of "m".

4. A matched filter bank as claimed in claim 1, wherein said sampling and holding unit is a sampling shift register of a plurality of stages of said number of "m".

5. A matched filter bank as claimed in claim 1, further comprising:
   a mask register of "m" stages which stores control signals for selecting said outputs of said multiplication circuits corresponding to said length of said coefficient data; and
   a multiplexer which selectively outputs one or more of said outputs among said "m" number of multiplication outputs to said adder according to said control signals in said mask register.

6. A matched filter bank as claimed in claim 1, further comprising an input PN code register corresponding to one or more of said PN code registers, each of which stores said coefficient data to be stored in said PN code registers in a next symbol period, and transfers said coefficient data parallelly to said corresponding PN code registers just before said next symbol period.

7. A matched filter bank as claimed in claim 1, further comprising an input mask register corresponding to said mask register, which stores said control signals to be stored in said mask register in a next symbol period, and transfers said control signals parallelly to said mask register just before said next symbol period.

8. A matched filter bank as claimed in claim 6, said input PN register comprising a plurality stages parallel latched of said number of "m".

9. A matched filter bank as claimed in claim 7, said input mask register comprising a plurality stages parallel latched of said number of "m".

10. A matched filter bank as claimed in claim 1, further comprising a sampling and holding control circuit which controls said sampling and holding unit.

11. A matched filter bank as claimed in claim 6 or 10, wherein said sampling and holding control circuit controls said input PN code register so that said coefficient data is input to said input PN code register synchronously to a timing when said sampling and holding unit samples and holds said input signal.

12. A matched filter bank as claimed in claim 7 or 10, wherein said sampling and holding control circuit controls said input mask register so that said control signals are input to said input mask register synchronously to a timing when said sampling and holding unit samples and holds said input signal.

13. A matched filter bank as claimed in claim 1, wherein a number of said adders is said number "n" corresponding to said "n" number of said groups of said multiplication circuits, and each said adder adds said outputs of said corresponding multiplication circuit of a number corresponding a length of said coefficient data from "m" number of said outputs of said corresponding multiplication circuit.

14. A matched filter bank as claimed in claim 1, wherein a number of said adders is one, which is connected to said total groups of multiplication circuits through a multiplexer which selectively connects one of said groups to said adder in a time sharing manner.

15. A matched filter bank as claimed in claim 1, further comprising a a plurality of registers corresponding to said groups of multiplication circuits, and a selector for connecting said output of said adder to one of said registers selectively.

16. A matched filter bank as claimed in claim 1, each said multiplication circuit comprising:
   one or more of input capacitances having inputs and outputs which are connected at their input to an input voltage;
   an inverting amplifier having input and output which is connected at its input to said outputs of said input capasitances;
   one or more of feedback capacitances having inputs and outputs which are connected at their outputs to said output of said inverting amplifier; and
   one or more of switched for connecting said outputs of one or more of said input capacitances, or said inputs of one or more of said feedback capacitances to said input of said inverting amplifier or to a reference voltage.

17. A matched filter bank as claimed in claim 16, wherein a plurality of said input capacitances are provided, and said switches are a plurality of input switches corresponding to said input capacitances, each said input switch connecting said output of said corresponding input capacitance to said input of said inverting amplifier or to a reference voltage.

18. A matched filter bank as claimed in claim 16, wherein a plurality of said feedback capacitances are provided, and said switches are a plurality of feedback switches corresponding to said feedback capacitances, each said feedback switch connecting said input of said corresponding feedback capacitance to said input of said inverting amplifier or to a reference voltage.

* * * * *